(No Model.) 3 Sheets—Sheet 1.
A. S. HUBBARD.
AUTOMATIC SWITCH FOR CHARGING OR DISCHARGING SECONDARY BATTERIES.

No. 589,128. Patented Aug. 31, 1897.

WITNESSES: INVENTOR
Albert S. Hubbard
BY
ATTORNEY (No Model.) 3 Sheets—Sheet 2.

A. S. HUBBARD.
AUTOMATIC SWITCH FOR CHARGING OR DISCHARGING SECONDARY BATTERIES.

No. 589,128. Patented Aug. 31, 1897.

WITNESSES:
D. Petri-Palmedo
R. H. Chamberlain

INVENTOR
Albert S. Hubbard
BY
Inman W. Walters
ATTORNEY.

(No Model.) 3 Sheets—Sheet 3.
A. S. HUBBARD.
AUTOMATIC SWITCH FOR CHARGING OR DISCHARGING SECONDARY BATTERIES.
No. 589,128. Patented Aug. 31, 1897.
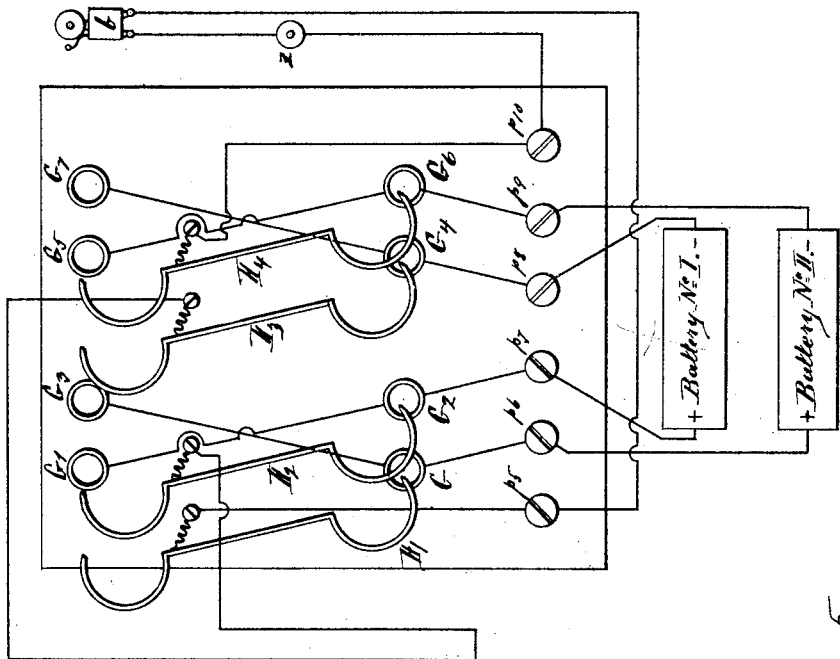
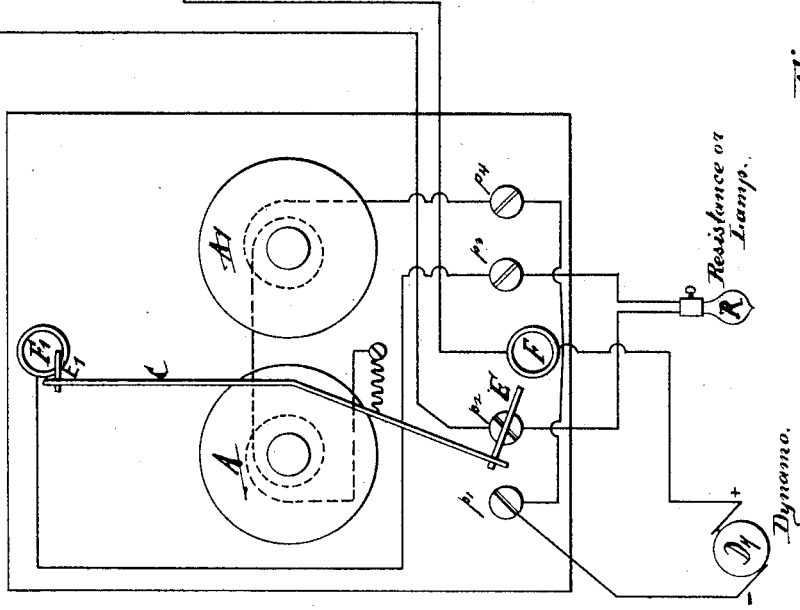
Fig. 5.
WITNESSES:
INVENTOR
Albert S. Hubbard
BY
ATTORNEY.

UNITED STATES PATENT OFFICE.

ALBERT S. HUBBARD, OF NEW YORK, N. Y., ASSIGNOR TO THE ELECTROCHEMICAL STORAGE BATTERY COMPANY, OF SAME PLACE.

AUTOMATIC SWITCH FOR CHARGING OR DISCHARGING SECONDARY BATTERIES.

SPECIFICATION forming part of Letters Patent No. 589,128, dated August 31, 1897.

Application filed October 23, 1896. Serial No. 609,815. (No model.)

*To all whom it may concern:*

Be it known that I, ALBERT S. HUBBARD, a citizen of the United States, residing at New York, in the county and State of New York, have invented a certain new and useful Automatic Switch for the Purpose of Charging one Set of Storage Batteries while Discharging the other Set, of which the following is a specification.

My invention relates to the use of storage batteries for bells, telephones, telegraphs, and other signaling purposes and to the apparatus for charging the same.

Prior to my invention an apparatus has been proposed consisting of two or more sets of storage batteries connected to the charging and discharging circuits through the medium of switches so arranged and connected that with the switches in one position one set of batteries is charging while the other is being discharged, and when the switches are set in the other position this order is reversed. This arrangement had the serious disadvantage of requiring the changing of the position of the switches by hand at more or less regular intervals. The object of this present invention is to do away with the manual operation and to accomplish the changing of the switches automatically. I attain this object by the mechanism as illustrated in the accompanying drawings, in which—

Figure 2:
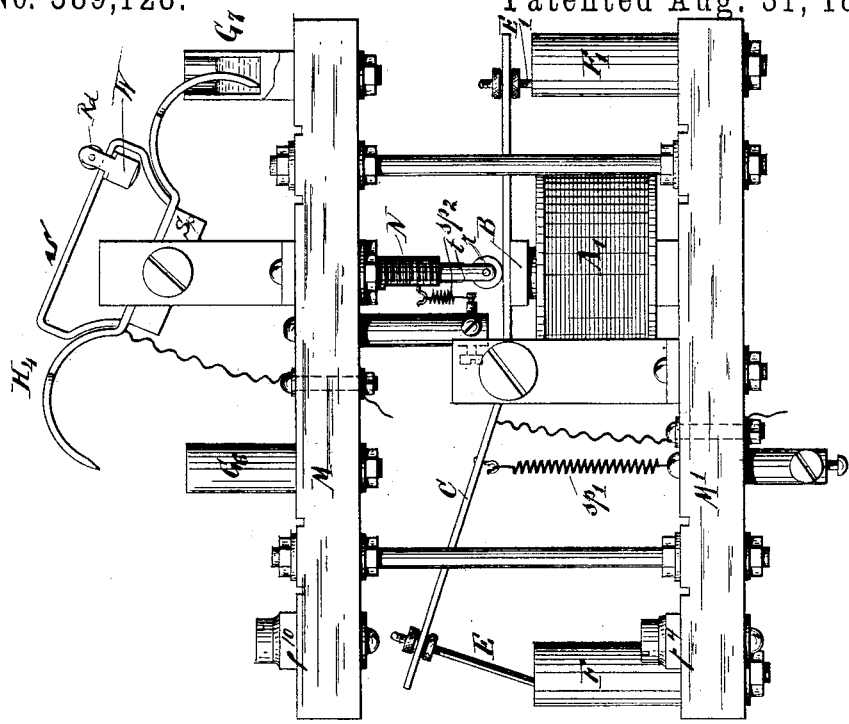
Figure 1:
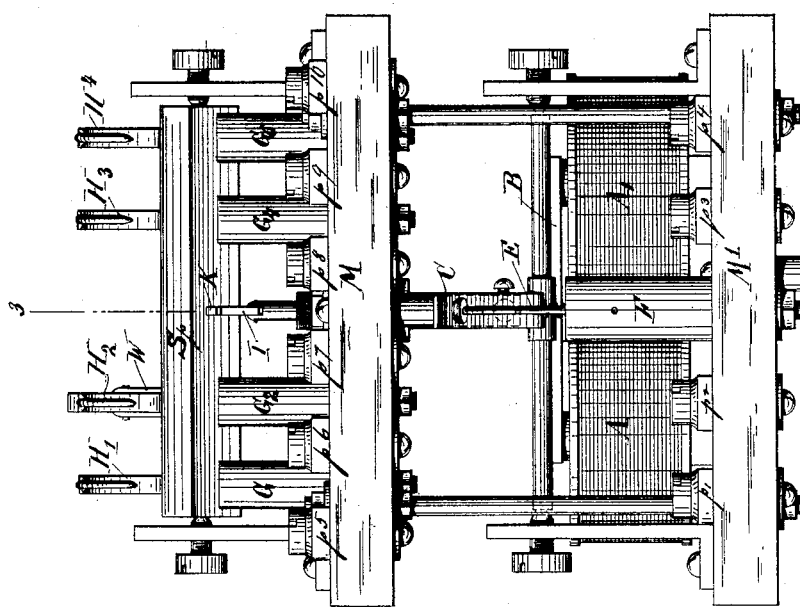
Figure 2:
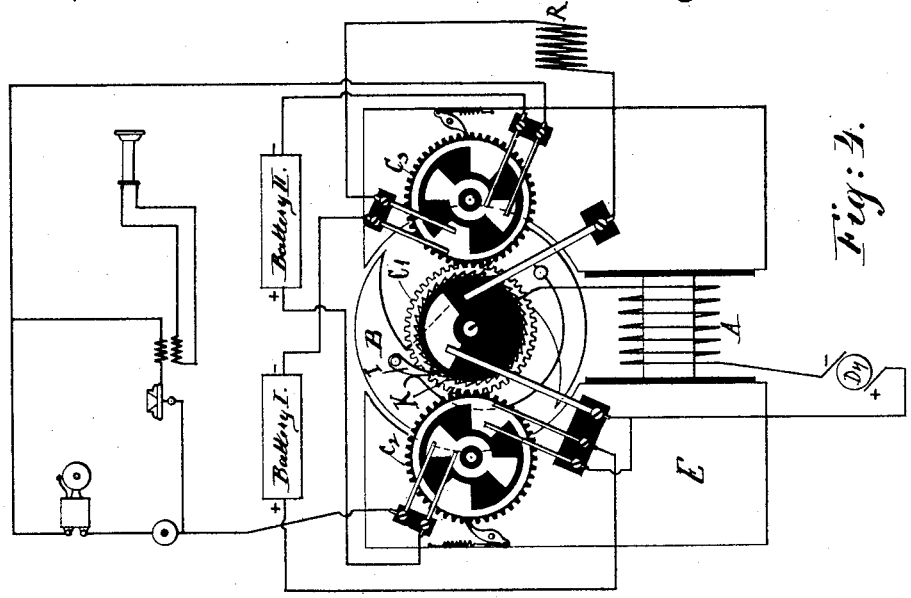
Figure 3:
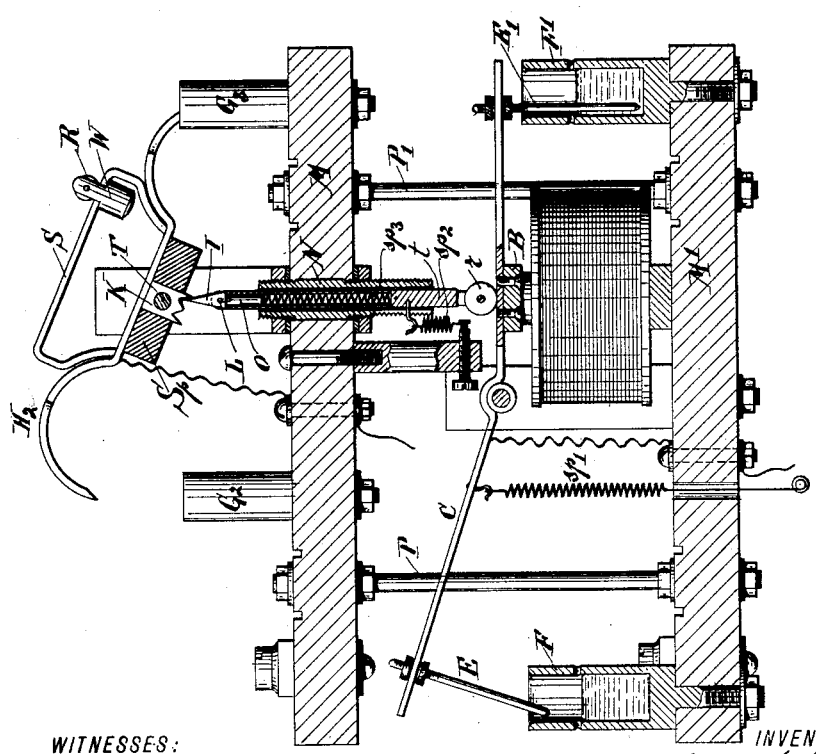

Figure 1 shows a front view; Fig. 2, a side elevation, and Fig. 3 a cross-section on the dotted line 3 in Fig. 1. Fig. 5 shows a diagrammatical view of the connections in the apparatus shown in Figs. 1 to 3. Fig. 4 shows a modified arrangement of the switch.

Corresponding parts are marked with the same letters and figures in all the drawings.

A A' are the coils of two magnets, and B is an armature mounted in such a manner as to move within the magnetic field created by energizing the coils A A' on the rocking arm C, which carries the two contact-points E and E', which play in and out of the mercury-cups F and F'.

$sp'$ shows a spring arranged for the purpose of retracting the armature from the magnets after the current has ceased to energize the coils A and A'.

On the top of the armature B rests the hollow rod $t$, with the friction-wheel $r$, which it carries, at its lower end. The rod $t$ moves in an adjustable casing N and carries on its upper end a pawl I, movably fastened thereon by means of the pin L and supported by the sliding pin O, which is pressed against the base of the pawl by the spring $sp^3$. The rod $i$ is kept in place against B by means of spring $sp^2$. The pawl I engages a ratchet K, fastened on the center of the support $Sp$ of the four rocking arms H' H² H³ H⁴. These four rocking arms are arranged in such a manner as to either dip into the mercury-cups G G² G⁴ G⁶, respectively, or into the mercury-cups arranged on the opposite side G' G³ G⁵ G⁷. The position of the rocking arms is determined by the movements of the ratchet and pawl caused by the movements of the armature B.

Fig. 5 serves best to illustrate the operation of the switch.

The apparatus shows the position in which battery 1 is being charged while battery 2 is in the service-circuit, here represented by a bell and push-button. In this position the armature B is drawn against the magnets and the rocking arms make contact in the mercury-cups G G² G⁴ G⁶, the current passing from the dynamo D$y$ to the binding-post $p'$, to the binding-post $p^4$, through the coils A' and A to the rocking arm C, through the contact-point E' and the mercury-cup F' to the binding-post $p^3$, through the resistance R to the binding-post $p^2$, to H³, through G⁴ to $p^8$, and to battery No. I from the battery returning to $p^7$, to G², through H² to F, and back to the dynamo, battery No. II at the same time furnishing its energy to the service-current represented by the push-button $z$ and the bell $b$, through the binding-post $p^7$ to G, through H' to $p^5$, to bell $b$, through push-button $z$ to $p^{10}$, through H⁴, to G⁶, to $p^9$, and back to the battery No. II. At the moment of the stoppage of the dynamo, the armature being torn from the magnets by $sp^2$, the contact in F' is broken and a new contact established at F by means of contact-point E. At the same time the rod $t$ is raised and the pawl engaging one of the teeth of the ratchet, the position of the rocking arms is shifted so as to make contact in G', G³, G⁵, and G⁷. This shifts the newly-charged battery No. I on the service-circuit and leaves battery No. II ready for a charging as soon as the dynamo is started up again. The current passes in this position from battery No. I to $p^7$, to G', through H' to $p^5$, to bell, through $z$ to $p^{10}$, to $H^4$, to $G^7$, to $p^8$, and back to the battery. When the dynamo starts up again, the current passes for the first moment through $p'$ to $p^4$, around the coils A' and A to C, through E and F back to the dynamo. The current is, however, immediately broken at F by the action of the magnets and a contact is again established at F I. The current now passes from the battery to $p'$ $p$ $p^4$, around AI and A, through C E' F' $p^3$, through R to $p^2$, to $H^3$ $G^5$ $G^6$ $p^9$, to battery No. II, and returning to $p^6$ G $G^3$ $H^2$ F and back to the dynamo. The position of the form rocking arms is only changed every time that the source of electricity energizing the coils A and A' has to be shut off. To hold the rocking arms more securely in their temporary position, a little sliding weight W has been arranged on top of the common support, moving on the wire or rail S by means of the flanged wheel R$d$.

The whole mechanism is suitably mounted between two plates M and M', made from some non-conducting material, such as marble, slate, wood, rubber, &c.

Fig. 4 illustrates the same principle of shifting the contacts on charging and discharging arranged to operate by a rotary in place of the rocking movement.

Having thus fully described my invention, what I claim, and desire to secure by Letters Patent, is—

In an automatic charging-switch for storage batteries the combination of a charging-circuit and a working circuit, two sets of storage batteries, connections between the charging and working circuits and said batteries, a switch for alternating the connections between the storage batteries, and the charging and working circuits held out of operation by a magnet in the charging-circuit, whereby the circuit connections are changed upon the cessation of the charging-current, all for the purpose as set forth and described.

ALBERT S. HUBBARD.

Witnesses:
R. N. CHAMBERLAIN,
SIG. T. W. ROSENBLATZ.